US009664277B1

(12) United States Patent
Jeong et al.

(10) Patent No.: US 9,664,277 B1
(45) Date of Patent: May 30, 2017

(54) CONTROL METHOD OF DUAL CLUTCH TRANSMISSION FOR VEHICLE AND CONTROL SYSTEM FOR THE SAME

(71) Applicants: Hyundai Motor Company, Seoul (KR); KIA Motors Corporation, Seoul (KR)

(72) Inventors: Dong Hoon Jeong, Osan-si (KR); Joung Chul Kim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/264,825

(22) Filed: Sep. 14, 2016

(30) Foreign Application Priority Data

May 2, 2016 (KR) .................. 10-2016-0054284

(51) Int. Cl.
  *B60W 10/00* (2006.01)
  *F16H 61/688* (2006.01)
  *F16H 3/12* (2006.01)
  *F16H 3/00* (2006.01)

(52) U.S. Cl.
  CPC .......... *F16H 61/688* (2013.01); *F16H 3/006* (2013.01); *F16H 3/12* (2013.01)

(58) Field of Classification Search
  CPC .......... F16H 61/688; F16H 3/006; F16H 3/12
  See application file for complete search history.

(56) References Cited

U.S. PATENT DOCUMENTS

| 2005/0197232 A1* | 9/2005 | Matsumura | ........... F16D 48/064 |
| | | | 477/5 |
| 2007/0051196 A1* | 3/2007 | Baldwin | ............. B60W 10/113 |
| | | | 74/335 |
| 2013/0073154 A1* | 3/2013 | Tanaka | .................... F16D 48/06 |
| | | | 701/54 |
| 2013/0197769 A1* | 8/2013 | Schneider | ........... F16H 61/0403 |
| | | | 701/68 |
| 2015/0337952 A1* | 11/2015 | Cho | ...................... B60W 10/10 |
| | | | 701/54 |

FOREIGN PATENT DOCUMENTS

KR      10-2012-0000849         1/2012

* cited by examiner

*Primary Examiner* — David J Hlavka
(74) *Attorney, Agent, or Firm* — Brinks Gilson & Lione (57) ABSTRACT

The present disclosure relates to a control method of a dual clutch transmission for a vehicle and a control system for the dual clutch. The control method includes: a pre-engagement-instructing step in which a synchronizing unit and a sub-gear stage starts to be synchro-meshed; a turn-off intention-determining step that determines whether a driver intends to turn off the neutralizing mode; a gear stage-comparing/determining step that determines whether the sub-gear stage and the main gear stage have been determined to be a same gear stage; a pre-engagement completion-determining step that determines whether the sub-gear stage and the synchronizing unit have been synchro-meshed; a sub-torque-applying step that applies torque to a clutch of a first input shaft on which the sub-gear stage is positioned; and a main torque-applying step in which when the synchronizing unit and the main gear stage are synchro-meshed, torque is applied to a clutch of a second input shaft on which the main gear-stage is positioned and the torque applied to the clutch of the first input shaft is removed.

15 Claims, 3 Drawing Sheets

CONTROL METHOD OF DUAL CLUTCH TRANSMISSION FOR VEHICLE AND CONTROL SYSTEM FOR THE SAME

CROSS REFERENCE TO RELATED APPLICATION

The present application claims priority to and the benefit of Korean Patent Application No. 10-2016-0054284, filed May 2, 2016, which is incorporated herein by reference in its entirety.

FIELD

The present disclosure relates to a control method of a dual clutch transmission for a vehicle to transmit power to an axle shaft.

BACKGROUND

The statements in this section merely provide background information related to the present disclosure and may not constitute prior art.

In order to allow a vehicle to coast downhill or drive a vehicle at a predetermined speed without requiring the driver to press down the accelerator pedal, it may be possible to stop supplying fuel to the engine or directly disengage the clutch of a transmission to improve fuel efficiency.

Such control can temporarily improve fuel efficiency because fuel is not consumed, but the engine may place a load on the vehicle running in this state, so excessive deceleration may occur. Accordingly, a desired speed cannot be reached upon re-acceleration, and the effect of fuel efficiency improvement may be reduced.

A method of improving fuel efficiency that reduces deceleration and increases the coasting distance by disengaging the clutch of a transmission in neutral may be proposed as an alternative to such control.

However, in order to shift to the neutral position when a vehicle coasts, it is required to engage the clutch to accelerate and shift to a desired gear corresponding to the current driving state, so an acceleration delay or torque transmission delay may be caused by the time taken to shift.

The description provided above as a related art of the present disclosure is only for helping understanding the background of the present disclosure and should not be construed as being included in the related art known by those skilled in the art.

SUMMARY

The present disclosure provides a control method of a dual clutch transmission for a vehicle that can reduce acceleration delay by effectively reducing the time taken to engage a clutch and a gear when reaccelerating while a vehicle is running in a neutralizing mode, and a control system for the transmission.

A control method of a dual clutch transmission for a vehicle according to one form of the present disclosure includes: a pre-engagement-instructing step in which a control unit determines a sub-gear stage and a main gear stage in accordance with driving conditions of a vehicle and starts synchro-meshing a synchronizing unit and the sub-gear stage, when the control unit determines that a driving mode of the vehicle is a neutralizing mode; a turn-off intention-determining step in which the control unit determines whether a driver intends to turn off the neutralizing mode in accordance with whether an accelerator pedal in the vehicle is in a tip-in state after the synchronizing unit and the sub-gear stage are started to be synchro-meshed by the control unit in the pre-engagement-instructing step; a gear stage-comparing/determining step that determines whether the sub-gear stage and the main gear stage have been determined to be the same gear stage, when it is determined that the accelerator pedal in the vehicle has been pressed down and the driver intends to turn off the neutralizing mode in the turn-off intention-determining step; a pre-engagement completion-determining step that determines whether the sub-gear stage and the synchronizing unit have been synchro-meshed, when it is determined that the sub-gear stage and the main gear stage are different in the gear stage-comparing/determining step; a sub-torque-applying step in which the control unit applies torque to a clutch of a first input shaft on which the sub-gear stage is positioned, when it is determined that the sub-gear stage and the synchronizing unit have been synchro-meshed in the pre-engagement completion-determining step; and a main torque-applying step in which when torque is applied to the clutch of the first input shaft in the sub-torque-applying step, the control unit instructs the synchronizing unit to synchro-mesh with the main gear stage, and when the synchronizing unit and the main gear stage are synchro-meshed, the control unit applies torque to a clutch of a second input shaft on which the main gear-stage is positioned and removes the torque applied to the clutch of the first input shaft.

An expected RPM of the first input shaft and an engine RPM in the neutralizing mode at a current vehicle speed may be included in the driving conditions of a vehicle in the pre-engagement-instructing step.

The engine may be controlled at an idle RPM or fuel-cut may be performed by the control unit in the neutralizing mode of the vehicle.

When fuel-cut is performed on the engine in the neutralizing mode, the control unit may take a restart RPM of the engine as the engine RPM in the neutralizing mode.

The sub-gear stage may be determined by the control unit such that the expected RPM of the first input shaft is smaller than the engine RPM in the neutralizing mode in the pre-engagement-instructing step.

The control unit may determine a gear stage in which the difference between the expected RPM and the engine RPM is the smallest of a plurality of gear stages in which the expected RPM of the first input shaft is smaller than the engine RPM in the neutralizing mode to be the sub-gear stage in the pre-engagement-instructing step.

When there is no gear stage in which the expected RPM of the first input shaft is smaller than the engine RPM in the neutralizing mode, the control unit may determine the highest gear stage of a plurality of gear stages to be the sub-gear stage in the pre-engagement-instructing step.

The control unit may determine a reference gear stage that is the highest gear stage of the gear stages within an allowable range of the engine at a current vehicle speed and may determine the main gear stage using the reference gear stage and the sub-gear stage in the pre-engagement-instructing step.

The control unit may determine the reference gear stage from a shifting pattern map in which allowable gear stages are determined and stored in advance with the current vehicle speed as a variable in the pre-engagement-instructing step.

Any one of the gear stages on the second input shaft may be determined to be the reference gear stage in the pre-engagement-instructing step.

When the reference gear stage is lower than the sub-gear stage, the control unit determines the reference gear stage as the main gear stage, and when the reference gear stage is higher than the sub-gear stage, the control unit may determine the sub-gear stage as the main gear stage in the pre-engagement-instructing step.

The method may further include an independent sub-torque-applying step in which when it is determined that the sub-gear stage and the main gear stage are the same gear stage in the gear stage-comparing/determining step, and when the synchronizing unit and the sub-gear stage have been synchro-meshed, the control unit turns off the neutralizing mode of the vehicle while applying torque to the clutch of the first input shaft.

The method may further include: a required time-determining step that determines whether a time that is taken to synchro-mesh the sub-gear stage is longer than a reference time in a current state, when it is determined that the sub-gear stage and the synchronizing unit have not been synchro-meshed in the pre-engagement completion-determining step; and an independent main torque-applying step in which when it is determined that the time that is taken to synchro-mesh the sub-gear stage is longer than the reference time in the required time-determining step, the control unit cancels a synchro-mesh of the sub-gear stage, gives an instruction to synchro-mesh the main gear stage, and applies torque to the clutch of the second input shaft.

The method may further include: a pre-engagement-continuing step in which when it is determined that the time that is taken to synchro-mesh the sub-gear stage is less than the reference time in the required time-determining step, the control unit synchro-meshes the sub-gear stage while reducing the rate of increase of the torque from the engine, in which when it is determined that the sub-gear stage and the synchronizing unit have been synchro-meshed in the pre-engagement completion-determining step or in the pre-engagement-continuing step, torque is applied to the clutch of the first input shaft, on which the sub-gear stage is mounted, by the control unit in the sub-torque-applying step.

A system for controlling a dual clutch transmission for a vehicle according to another form of the present disclosure includes: a transmission that is composed of a first input shaft, a second input shaft, and an output shaft, in which a plurality of gear stages is mounted on the first input shaft and the second input shaft and clutches are provided for the first input shaft and the second input shaft, respectively; a synchronizing unit that is synchro-meshed with any one of the gear stages on the first input shaft or the second input shaft of the transmission; a sensor unit that measures an RPM of the first input shaft, an RPM of the second input shaft, an engine RPM, a vehicle speed, and the pressed amount of an accelerator pedal; and a control unit that determines whether a driving mode of a vehicle is a neutralizing mode, determines a sub-gear stage and a main gear stage when the vehicle is in the neutralizing mode, instructs the synchronizing unit to synchro-mesh with the sub-gear stage in accordance with driving conditions of the vehicle when the sub-gear stage is determined, determines whether a drive intends to turn off the neutralizing mode in accordance with whether the accelerator pedal has been tipped in after the instruction of synchro-meshing the sub-gear stage, determines whether the sub-gear stage and the main gear stage have been determined to be the same gear stage when a driver intends to turn off the neutralizing mode, determines whether the sub-gear stage has been synchro-meshed when the sub-gear stage and the main gear stage have been determined to be different gear stages, applies torque to the clutch of the first input shaft on which the sub-gear stage is mounted when the sub-gear stage has been synchro-meshed, instructs the synchronizing unit to synchro-mesh with the main gear stage, and removes the torque applied to the clutch of the first input shaft while applying torque to the clutch of the second input shaft mounted with the main gear-stage when it is determined that the synchronizing unit and the main gear stage have been synchro-meshed.

According to the control method of a dual clutch transmission for a vehicle, it is possible to reduce acceleration delay by effectively reducing the time taken to engage a clutch and a gear stage when reaccelerating while a vehicle is running in a neutralizing mode.

In particular, when a vehicle is running in the neutralizing mode, the control unit determines and engages a sub-gear stage in advance in accordance with the current driving condition of the vehicle and makes torque be transmitted through the sub-gear stage in the early stage of reacceleration, whereby it is possible to effectively inhibit or prevent acceleration delay.

Further, the control unit determines the sub-gear stage on the basis of the current engine RPM that is a driving condition of the vehicle, whereby torque can be transmitted to a gear stage corresponding to the driving condition of the vehicle in the early stage of reacceleration.

Further, while torque is transmitted to the sub-gear stage, the main gear stage is engaged and power transmitted through the sub-gear stage is gradually switched to the main gear stage, thereby effectively inhibiting or preventing stoppage of torque transmission.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
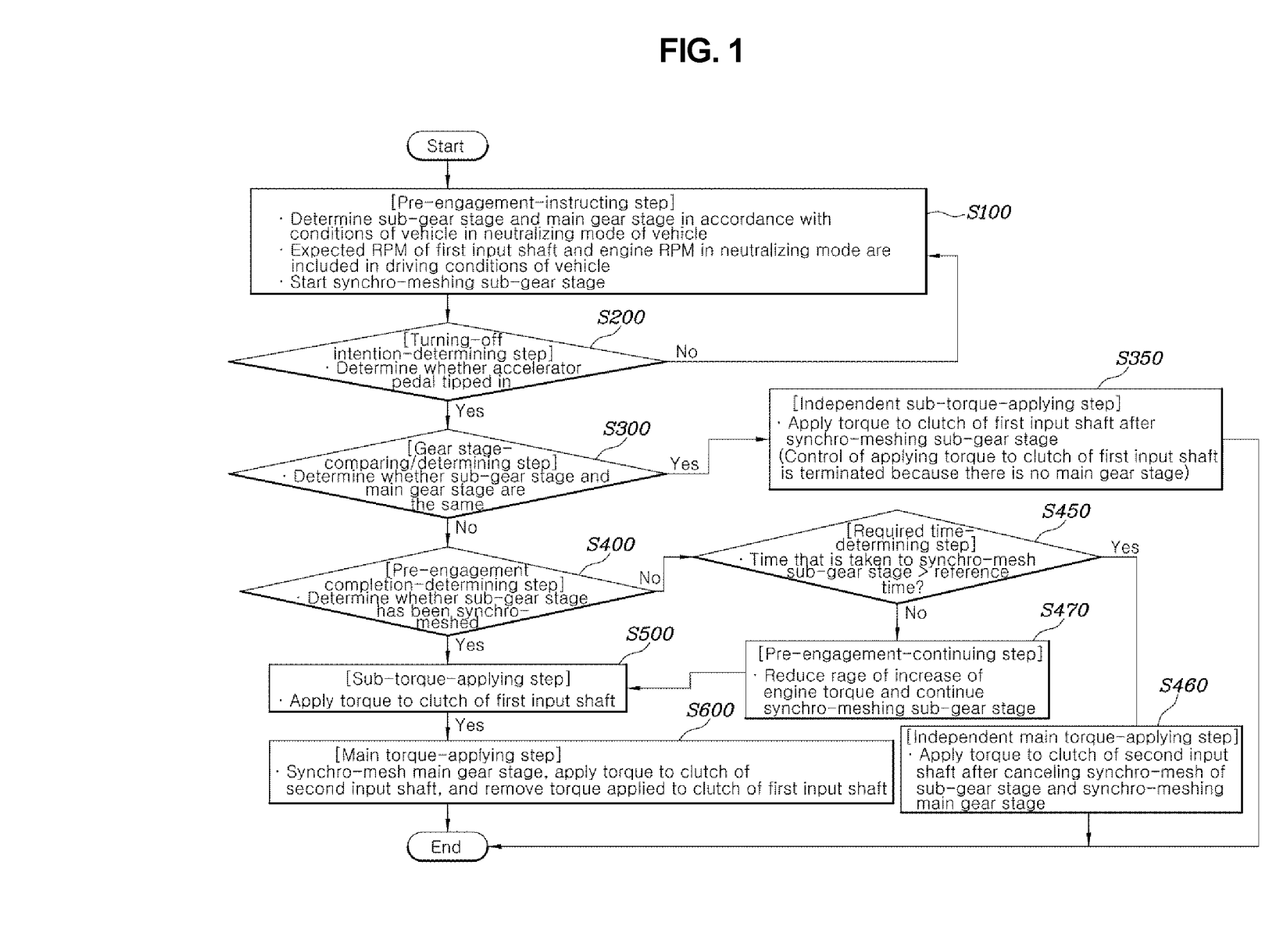
FIG. 1 is a flowchart illustrating a control method of a dual clutch transmission for a vehicle.
Figure 2:
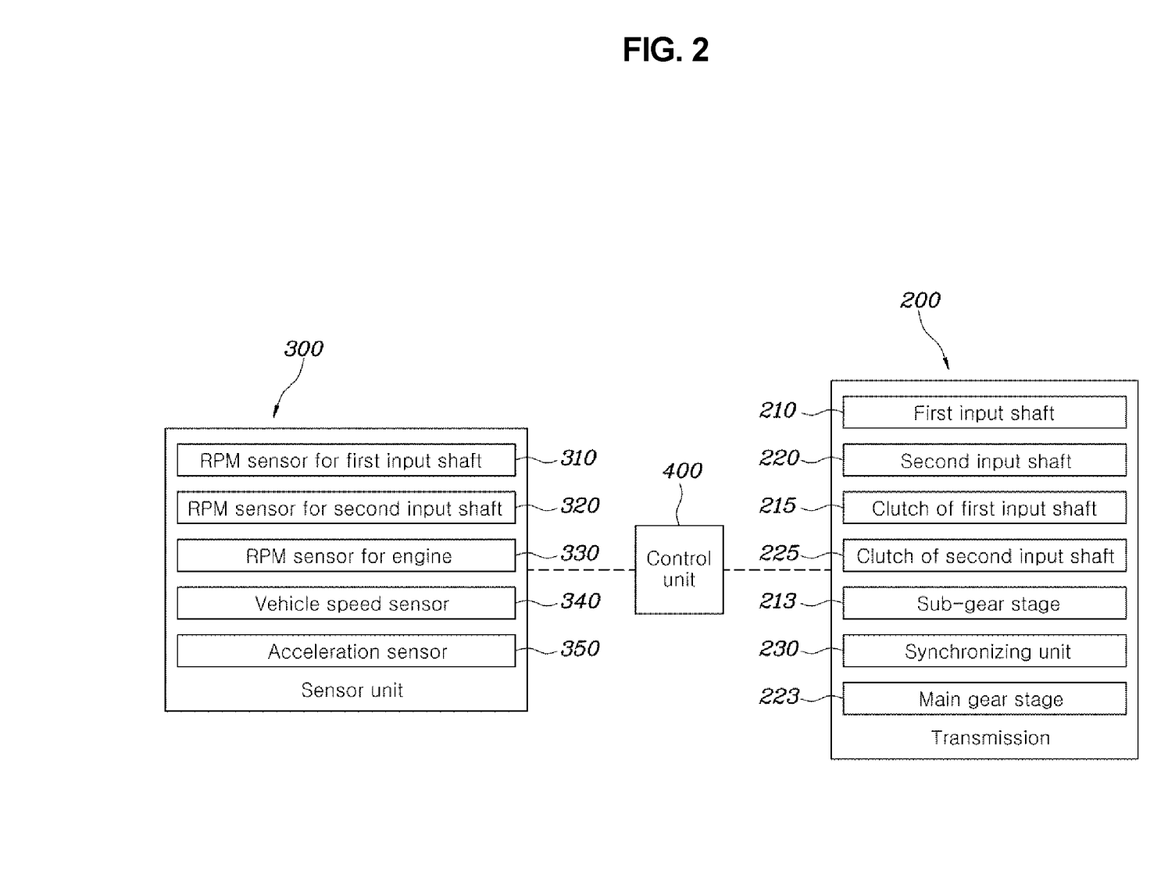
FIG. 2 is a diagram schematically showing a control system of a dual clutch transmission for a vehicle.
Figure 3:
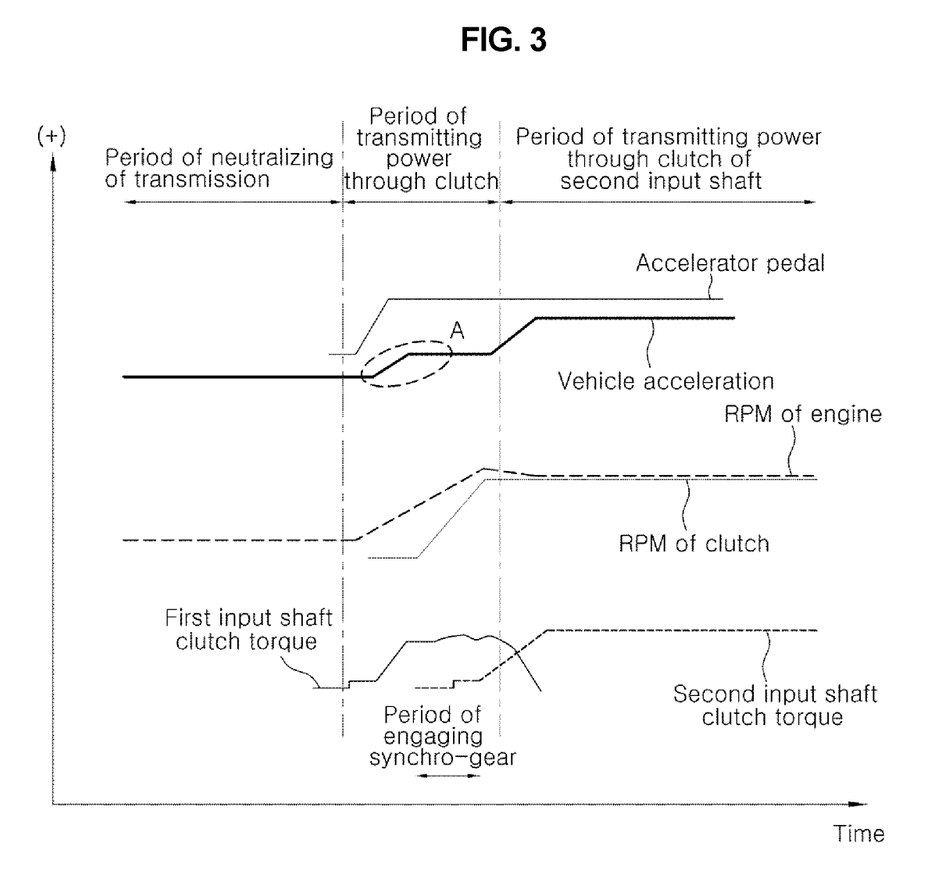
FIG. 3 is a graph showing a shifting state by a method of controlling a dual clutch transmission of a vehicle.

A method of controlling a dual clutch transmission 200 for a vehicle according to one form of the present disclosure, as shown in FIGS. 1 to 3, includes: a pre-engagement-instructing step (S100) in which a control unit 400 determines a sub-gear stage 213 and a main gear stage 223 based on driving conditions of a vehicle and starts synchro-meshing a synchronizing unit 230 and the sub-gear stage 213 when the control unit 400 determines that the driving mode of the vehicle is a neutralizing mode; a turn-off intention-determining step (S200) in which the control unit 400 determines whether a driver intends to turn off the neutralizing mode based on whether an accelerator pedal in the vehicle is in a tip-in state after the synchronizing unit 230 and the sub-gear stage 213 are started to be synchro-meshed by the control unit 400 in the pre-engagement-instructing step (S100); a gear stage-comparing/determining step (S300) that determines whether the sub-gear stage 213 and the main gear stage 223 have been determined to be the same gear stage when it is determined that the accelerator pedal in the vehicle has been pressed down and the driver has the intention to turn off the neutralizing mode in the turn-off intention-determining step (S200); a pre-engagement completion-determining step (S400) that determines whether the sub-gear stage 213 and the synchronizing unit 230 have been synchro-meshed when it is determined that the sub-gear stage 213 and the main gear stage 223 are different in the gear stage-comparing/determining step (S300); a sub-torque-applying step (S500) in which the control unit 400 applies torque to a clutch 215 of a first input shaft 210 on which the sub-gear stage 213 is positioned when it is determined that the sub-gear stage 213 and the synchronizing unit 230 have been synchro-meshed in the pre-engagement completion-determining step (S400); and a main torque-applying step (S600) in which when torque is applied to the clutch 215 of the first input shaft 210 in the sub-torque-applying step (S500), the control unit 400 instructs the synchronizing unit 230 to synchro-mesh with the main gear stage 223, and when the synchronizing unit 230 and the main gear stage 223 are synchro-meshed, the control unit 400 applies torque to a clutch 225 of a second input shaft 220 on which the main gear-stage 223 is positioned and removes the torque applied to the clutch 215 of the first input shaft.

In detail, in the pre-engagement-instructing step (S100), when the control unit 400 determines that the driving mode of the vehicle is a neutralizing mode, the control unit 400 determines the sub-gear stage 213 and the main gear stage 223 based on the driving conditions of the vehicle and starts synchronizing the synchronizing unit 230 and the sub-gear stage 213.

The term "neutralizing mode" of a vehicle, as used herein, means the situation in which the clutches 215 and 225 of the transmission are disengaged to inhibit excessive deceleration by the engine while the vehicle coasts or runs in a tip-out state in which an accelerator of the vehicle is released.

The control unit 400 can determine whether the vehicle has run for a predetermined time or longer in the accelerator tip-out state and whether the clutches 215 and 225 are disengaged. The control unit 400 also can determine whether the driving mode of the vehicle is the neutralizing mode by measuring the change in vehicle speed.

The control unit 400, in one form, may be a TCU (Transmission Control Unit) for generally controlling the transmission 200. In another form, a control unit 400 may be different from a TCU. For illustration purpose, the control unit 400 is described as the TCU in the present disclosure.

Once the neutralizing mode of the vehicle is determined, the control unit 400 determines the sub-gear stage 213 and the main gear stage 223 based on the driving conditions of the vehicle. Various conditions may be included in the driving condition of the vehicle, for example, a vehicle speed and an engine RPM.

The present disclosure may include a vehicle speed sensor 340, an acceleration sensor 350 that determines the pressed amount of an accelerator pedal, an engine RPM sensor 330, a first input shaft RPM sensor 310, and a second input shaft RPM sensor 320.

The sub-gear stage 213 means a gear stage that is a torque transmission path in an early stage of reacceleration when the neutralizing mode of the vehicle is turned off and reacceleration is started. The main gear-stage 223 is a gear stage that is a torque transmission path at the time of acceleration while being synchro-meshed with the synchronizing unit 230 at the time of reacceleration.

That is, the main gear stage 223 is a desired gear stage for driving under the reacceleration after the neutralizing mode of the vehicle is turned off, and the sub-gear stage 213 is the torque transmission path formed prior to the main gear stage 223 at the initial stage of the reacceleration, thereby maintaining torque transmission to an axle shaft during a step of synchro-meshing the main gear stage 223 and of engaging the clutch 225.

As described above, once the sub-gear stage 213 is determined based on the driving conditions of the vehicle, the control unit 400 controls the synchronizing unit 230 so that the sub-gear stage 213 and the synchronizing unit 230 start to be synchro-meshed.

Since the present disclosure relates particularly to the dual clutch transmission 200, a pair of input shafts is provided to the transmission 200. The synchronizing unit 230 includes: a synchronizer which is mounted on an input shaft and is synchro-meshed with gears, and an actuator for operating the synchronizer. In another form, a plurality of synchronizers and actuators may be provided.

In one form, a plurality of gears for a gear stage may be mounted on an input shaft of the transmission 200, and a synchronizer is mounted between each pair of the gears. The synchronizers slide on the input shaft, and each synchronizer may synchro-mesh with one of the gears which is facing to the corresponding synchronizer. The actuator drives the synchronizer to slide.

That is, when the sub-gear stage 213 is determined, the control unit 400 performs pre-engagement of the sub-gear stage 213 by synchronizing the synchronizing unit 230 and the sub-gear stage 213. The pre-engagement serves to synchronize the gear stage to be a power transmission path in advance in order to reduce the time taken to shift by eliminating synchronization while shifting.

As a result, when the sub-gear stage 213 is determined by the control unit 400, the sub-gear stage 213 is engaged in advance so that power can be transmitted through the sub-gear stage 213 without delay in the sub-torque-applying step (S500) to be performed later when a driver reaccelerates.

On the other hand, in the turn-off intention-determining step (S200), the control unit 400 determines whether the driver has the intention to turn off the neutralizing mode depending on the existence of a tip-in state of the accelerator pedal in the vehicle after the synchronizing unit 230 and the sub-gear stage 213 are synchro-meshed by the control unit 400 in the pre-engagement-instructing step (S100).

In detail, when the driver presses down the accelerator pedal, it means that the driver has no intention to maintain the neutralizing mode, and instead is about to reaccelerate, so the control unit 400 determines that the driver has the intention to turn off the neutralizing mode when receiving a signal showing that the accelerator pedal has been pressed down.

Further, when it is determined that the accelerator pedal in the vehicle is in a tip-in state (i.e., pressing down the accelerator pedal) and the driver has the intention to turn off the neutralizing mode in the turning-off intention-determining step (S200), it is determined in the gear stage-comparing/determining step (S300) whether the sub-gear stage 213 and the main gear stage 223 have been determined to be the same gear stage.

As described above, when the neutralizing mode is turned off, torque is transmitted first through the sub-gear stage 213 before the torque is transmitted through the main gear stage 223 for reacceleration.

However, when the sub-gear stage 213 and the main gear stage 223, determined by the control unit 400 in accordance with the driving conditions of the vehicle, are the same gear stage, torque cannot be alternately transmitted, as described above. Accordingly, the control unit 400 determines whether the sub-gear stage 213 and the main gear stage 223 have been determined to be the same gear stage.

Further, when it is determined that the sub-gear stage 213 and the main gear stage 223 are different in the gear stage-comparing/determining step (S300), it is determined whether the sub-gear stage 213 and the synchronizing unit 230 have been synchro-meshed in the pre-engagement completion-determining step (S400).

In detail, when it is determined that the sub-gear stage 213 and the main gear stage 223 are different gear stages, the control unit 400 determines that torque can be transmitted through the sub-gear stage 213 and the main gear stage 223 when the neutralizing mode is turned off.

Accordingly, torque is made to be transmitted through the sub-gear stage 213, but before this, it is determined whether synchronization of the sub-gear stage 213 instructed in the pre-engagement-instructing step (S100) has been achieved.

That is, the control unit 400 checks whether the sub-gear stage 213 can transmit torque by determining whether the sub-gear stage 213 has been synchro-meshed before making torque be transmitted through the sub-gear stage 213.

When it is determined that the sub-gear stage 213 and the synchronizing unit 230 have been synchro-meshed in the pre-engagement completion-determining step (S400), the control unit 400 applies torque to the clutch 215 on the first input shaft 210 mounted with the sub-gear stage 213 in the sub-torque-applying step (S500).

The transmission 200 is a dual clutch type including two input shafts, in which the input shaft mounted with the sub-gear stage 213 is the first input shaft 210 and the input shaft mounted with the main gear stage 223 is the second input shaft 220. The first input shaft 210 and the second input shaft 220 may be switched depending on determination of the sub-gear stage 213 and the main gear stage 223.

Further, it is assumed in the present disclosure that the torque transmitted through the first input shaft 210 and the sub-gear stage 213 is sub-torque, while the torque transmitted through the second input shaft 220 and the main gear stage 223 is main torque.

Since the sub-gear stage 213 is synchro-meshed with the synchronizing unit 230 in advance before actual shifting, as described above, torque is transmitted by immediately engaging the clutch 215 of the first input shaft 210 without a specific synchronizing process when the neutralizing mode is turned off.

Accordingly, it is possible to immediately transmit engine torque to the axle shaft without turning off the neutralizing mode and synchronizing a gear stage for reacceleration, so it is possible to reduce acceleration delay.

FIG. 3 is a graph showing the acceleration state of a vehicle when a neutralizing mode is turned off and the vehicle is reaccelerated in accordance with the present disclosure. If the transmission of sub-torque through the sub-gear stage 213, is not performed, the vehicle acceleration observed at the period "A" in FIG. 3 cannot be obtained, so acceleration delay occurs.

That is, the present disclosure allows the acceleration shown in the period "A" in FIG. 3 by engaging the sub-gear stage 213 in advance and engaging the clutch 215 of the first input shaft 210 without specific synchronizing when turning off the neutralizing mode, whereby it is possible to efficiently reduce acceleration delay in synchronizing to a desired gear stage and in engaging the clutch corresponding to the gear stage when turning off the neutralizing mode.

On the other hand, when torque is applied to the clutch 215 of the first input shaft 210 in the sub-torque-applying step (S500), in the main torque-applying step (S600), the control unit 400 instructs the synchronizing unit 230 to synchronize with the main gear stage 223, and when the synchronizing unit 230 and the main gear stage 223 are synchro-meshed, the controller 400 applies torque to the clutch 225 of the second input shaft 220 mounted with the main gear stage and removes the torque of the clutch 215 of the first input shaft.

In detail, when the clutch 215 of the first input shaft is engaged and sub-torque is transmitted to the axle shaft through the sub-gear stage 213 in the sub-torque-applying step (S500), the control unit 400 instructs the synchronizing unit 230 to synchronize with the main gear stage 223.

When the main gear stage 223 is synchro-meshed, the control unit 400 disengages the clutch 215 of the first input shaft and engages the clutch 225 of the second input shaft so that main torque can be transmitted to the axle shaft through the main gear stage 223.

That is, the main gear stage 223, which is the gear stage adapted for acceleration in the current driving state of the vehicle, is a gear stage for driving after the neutralizing mode is turned off, while the sub-gear stage 213 is a gear stage for temporarily transmitting torque to the axle shaft in the early stage when the neutralizing mode is turned off.

As a result, according to the present disclosure, when the vehicle coasts in a neutralizing mode while the clutches 215 and 225 are disengaged, the control unit 400 determines the sub-gear stage 213 and the main gear stage 223 that can realize appropriate reacceleration performance in the current driving state.

Further, sub-torque is transmitted to the axle shaft through the sub-gear stage 213 before main torque is transmitted through the main gear stage 223 for driving when the neutralizing mode is turned off, whereby it is possible to reduce the acceleration delay time of the vehicle.

Further, by engaging the sub-gear stage 213 in advance before the neutralizing mode is turned off, it is possible to eliminate the time taken to synchronize the sub-gear stage 213 when turning off the neutralizing mode, so it is possible to reduce the time taken to transmit sub-torque to the axle shaft.

Meanwhile, as shown in FIGS. 1 and 2, in the pre-engagement-instructing step (S100) of the method of controlling the dual clutch transmission 200 for a vehicle, the expected RPM of the first input shaft 210 and the engine RPM in the neutralizing mode at the current vehicle speed are included in the driving conditions of the vehicle.

When the clutches 215 and 225, which were disengaged while the vehicle was running, are engaged again, the rotational speeds of the clutches 215 and 225 to be engaged and the engine RPM are synchronized, at which time, when the difference between the rotational speeds of the clutches 215 and 225 and the engine RPM is too large, a shock is applied to the vehicle or the vehicle speed may not be appropriately controlled.

Accordingly, in the present disclosure, the expected RPM of the first input shaft 210, the clutch 215 of which is engaged when the neutralizing mode is turned off, and the engine RPM in the neutralizing mode are included in the driving conditions of the vehicle for determining the sub-gear stage 213 and the main gear stage 223.

The expected RPM of the first input shaft 210 means the RPM of the input shaft 210 that is obtained when the output RPM of the transmission 200, which depends on the vehicle speed, is transmitted to the first input shaft 210 at the gear ratio of the sub-gear stage 213, which is determined later.

As a result, in order to inhibit or prevent shocks from being applied to the vehicle or inappropriate control of the vehicle speed when the neutralizing mode is turned off and the clutch 215 of the first input shaft is engaged, the expected RPM of the first input shaft 210 and the engine RPM in the neutralizing mode are included in the driving conditions of the vehicle for determining the sub-gear stage 213 and the main gear stage 223.

On the other hand, as shown in FIGS. 1 and 2, in the method of controlling the dual-clutch transmission 200 for a vehicle according to one form of the present disclosure, the engine is controlled at an idle RPM or fuel-cut is performed by the control unit 400 in the neutralizing mode of the vehicle.

In detail, it may be considered that the neutralizing mode of a vehicle has the aim of improving fuel efficiency, and to this end, when the vehicle is running in the neutral position with the clutches 215 and 225 disengaged, the engine is controlled at an idle RPM or fuel-cut is performed in the neutralizing mode of the vehicle in order to inhibit or prevent unnecessary fuel consumption by the engine in the present disclosure.

When fuel-cut is performed, the engine cannot generate power, so the RPM gradually decreases and the vehicle consequently stops. Thereafter, when the driver presses down the accelerator pedal, the engine is restarted and returns to the normal operation state. Whether to control the engine at an idle RPM or perform fuel-cut depends on which one is selected as the first issue.

On the other hand, as shown in FIGS. 1 and 2, in the method of controlling the dual clutch transmission 200 for a vehicle according to one form of the present disclosure, when fuel-cut is performed on the engine in the neutralizing mode, the control unit 400 take the restart RPM of the engine as the engine RPM in the neutralizing mode.

In detail, when fuel-cut is performed in the neutralizing mode of a vehicle, the engine cannot generate power, so the engine RPM gradually decreases, which is meaningless as a driving condition of the vehicle.

Accordingly, when fuel-cut is performed in the neutralizing mode of the vehicle, the restart RPM of the engine is taken as the engine RPM in the neutralizing mode, and the sub-gear stage 213 and the main gear stage 223 are determined.

When the neutralizing mode of the vehicle is turned off, in which the clutches 215 and 225 are engaged, the engine to which fuel-cut has been applied is restarted, so it is advantageous to take the restart RPM of the engine as the engine RPM in the neutralizing mode for determining the sub-gear stage 213 and the main gear stage 223 that can inhibit or prevent shocks from being applied to the vehicle and inappropriate control of the vehicle speed.

Meanwhile, as shown in FIGS. 1 and 2, in the pre-engagement-instructing step (S100) of the method of controlling the dual clutch transmission 200 for a vehicle, the sub-gear stage 213 is determined by the control unit 400 such that the expected RPM of the first input shaft 210 is smaller than the engine RPM in the neutralizing mode.

In detail, the neutralizing mode of the vehicle is turned off when the driver presses down the accelerator pedal. That is, when the neutralizing mode of the vehicle is turned off, the driver presses down the accelerator pedal and the vehicle reaccelerates, so when the clutch 215 of the first input shaft 210 is engaged, torque from the engine should be transmitted to the first input shaft 210.

However, when the expected RPM of the first input shaft 210 is larger than the engine RPM, torque from the engine cannot be transmitted to the first input shaft 210 until the engine RPM is synchronized with the RPM of the first input shaft 210, so a predetermined additional time may be needed until the vehicle accelerates.

Accordingly, the sub-gear stage 213 is determined such that the expected RPM of the first input shaft 210 at the gear ratio of the sub-gear stage 213 becomes smaller than the engine RPM in the neutralizing mode. Accordingly, when the neutralizing mode is turned off and the clutch 215 of the first input shaft 210 is engaged, the engine RPM becomes larger than the RPM of the first input shaft 210, so torque from the engine can be transmitted to the first input shaft 210, and accordingly, acceleration delay of the vehicle can be reduced.

On the other hand, as shown in FIGS. 1 and 2, in the method of controlling the dual clutch transmission 200 for a vehicle according to another form of the present disclosure, the control unit 400 determines the gear stage in which the difference between the expected RPM and the engine RPM is the smallest, among a plurality of gear stages in which the expected RPM of the first input shaft 210 is smaller than the engine RPM in the neutralizing mode, as the sub-gear stage 213 in the pre-engagement-instructing step (S100).

In detail, the control unit 400 determines any one of gear stages where the expected RPM of the first input shaft 210 is smaller than the engine RPM as the sub-gear stage 213 to reduce the acceleration delay when determining the sub-gear stage 213, and additionally, the control unit 400 determines a gear stage, in which the difference between the expected RPM of the first input shaft 210 by the sub-gear stage 213 and the engine RPM is the smallest, as the sub-gear stage 213.

The clutch 215 of the first input shaft 210 is engaged when the neural mode is turned off to transmit sub-torque, and when the clutch 215 is engaged, the rotational speeds of the first input shaft 210 and the engine are synchronized and the engine torque is transmitted to the first input shaft 210.

When the RPMs of the first input shaft 210 and the engine are different, the clutch 215 slides and the rotational speeds are synchronized. In one form of the present disclosure, because the gear stage in which the difference between the expected RPM of the first input shaft 210 and the engine RPM is the smallest is taken as the sub-gear stage 213, the time desired to synchronize the rotational speeds of the first input shaft 210 and the engine is reduced.

On the other hand, as shown in FIGS. 1 and 2, in the method of controlling the dual clutch transmission 200 for a vehicle, when there is no gear stage in which the expected RPM of the first input shaft 210 is smaller than the engine RPM in the neutralizing mode, the control unit 400 takes the highest of a plurality of gear stages as the sub-gear stage 213 in the pre-engagement-instructing step (S100).

As described above, in order to reduce the time needed for transmitting sub-torque to the first input shaft 210, the sub-gear stage 213 is determined such that the expected RPM of the first input shaft 210 is the same as or smaller than the engine RPM, but the expected RPM of the first input shaft 210 may not be the same as or less than the engine RPM, depending on the driving situations.

For example, even if the highest gear stage is synchromeshed at a constant vehicle speed, the RPM of the first input shaft 210 is the same as or larger than the engine RPM, which is the case described above.

In this case, the highest gear stage of the gear stages in the transmission 200 is set as the sub-gear stage 213 so that the difference between the engine RPM and the expected RPM of the first input shaft 210 is minimized.

If the expected RPM of the first input shaft 210 is not the same as or smaller than the engine RPM at any one of the gear stages in the transmission 200, the difference between the expected RPM of the first input shaft 210 and the engine RPM is minimized when the highest gear stage is taken as the sub-gear stage 213.

Accordingly, it is possible to reduce the time that is desired until the rotational speeds of the engine and the first input shaft 210 are synchronized and accordingly torque can be transmitted when the engine RPM is smaller than the RPM of the first input shaft 210.

On the other hand, as shown in FIGS. 1 and 2, in the pre-engagement-instructing step (S100), the control unit 400 determines a reference gear stage, which is the highest of the gear stages within the allowable range of the engine at the current vehicle speed, and determines the main gear stage 223 using the reference gear stage and the sub-gear stage 213.

As described above, the main gear stage 223 is the gear stage in which the vehicle is running after the neutralizing mode of the vehicle is turned off. Accordingly, the control unit 400 determines the main gear stage 223 from the gear stages in which the engine RPM at the current vehicle speed can be included in the allowable range of the engine.

The RPM range in which the engine can show the optimum performance is determined in advance and the engine RPM, which is synchronized with the second input shaft 220, is made to be included in the allowable range of the engine when the vehicle is running at the main gear stage 223.

Further, considering that the neutralizing mode of the vehicle is turned off when the driver accelerates the vehicle by pressing down the accelerator pedal, the gear stage that is the highest of the gear stages in which the engine RPM is in the allowable range is taken as the reference gear stage, and the main gear stage 223 is determined by comparing the reference gear stage with the sub-gear stage 213.

That is, the reference gear stage is determined in consideration of the current vehicle speed and the allowable range of the engine and the optimum gear stage for driving when the neutralizing mode of the vehicle is turned off is reasonably determined by comparing the reference gear stage with the sub-gear stage 213.

Meanwhile, the control unit 400 determines a reference gear stage from a shifting pattern map in which allowable gear stages are determined and stored in advance with the current vehicle speed as a variable in the pre-engagement-instructing step (S100).

As described above, the allowable range within which the engine can show the optimum performance is determined in advance, and particularly, it is possible to determine the gear stage when the vehicle is running by determining whether the RPM desired for the engine at the current vehicle speed is in the allowable range.

When the allowable range of the engine may be determined in advance and the vehicle speed and the gear stage are determined, the RPM desired for the engine can be obtained, and a data map in which allowable gear stages are estimated in advance on the basis of the relationship with the vehicle speed when the vehicle is running can be determined.

Accordingly, a shifting pattern map where allowable gear stages when the vehicle is running in relation to the current vehicle speed is stored in advance in the control unit 400 and the reference gear stage for estimating the main gear stage 223 is determined by inputting the current vehicle speed into the shifting pattern map.

The shifting pattern map can be changed in various ways in accordance with the way the driving strategy is set, in terms of the design of the vehicle. For example, in order to enhance the running performance or to emphasize the fuel efficiency, the shifting pattern map may be determined differently.

In another form, it is possible to simply determine the reference gear stage without estimating all of the gear stages that are allowable at the current vehicle speed in accordance with the driving strategy of a vehicle, by using the shifting pattern map.

On the other hand, as shown in FIGS. 1 and 2, the method of controlling the dual clutch transmission 200 determines any one of the gear stages on the second input shaft 220 to be the reference gear stage in the pre-engagement-instructing step (S100).

In detail, in still another form of the present disclosure, the main gear stage 223 is determined by comparing the reference gear stage with the sub-gear stage 213, and when the reference gear stage is on the first input shaft 210 together with the sub-gear stage 213, torque is transmitted only through the first input shaft 210, so it may be not practical to prevent acceleration delay using the dual clutches 215 and 225.

Accordingly, by determining any one of the gear stages on the second input shaft 220 as the reference gear stage, the situation in which the main gear stage 223, to be determined later, and the sub-gear stage 213 are on the same shaft and the mechanism for preventing acceleration delay cannot be implemented may be avoided.

When the reference gear stage is lower than the sub-gear stage 213, the control unit 400 determines the reference gear stage to be the main gear stage 223, and when the reference gear stage is higher than the sub-gear stage 213, the control unit 400 determines the sub-gear stage 213 to be the main gear stage 223 in the pre-engagement-instructing step (S100).

In detail, the reference gear stage and the sub-gear stage 213 are determined, and then the lower of the gear stages is taken as the main gear stage 223. That is, when the reference gear stage is lower than the sub-gear stage 213, the reference gear stage is determined to be the main gear stage 223. And when the reference gear stage is higher than the sub-gear stage 213, the sub-gear stage 213 is determined to be the main gear stage 223.

As a result, considering that turning-off of the neutralizing mode of the vehicle means that the driver accelerates the vehicle by pressing down the accelerator pedal, the lowest of the available gear stages in consideration of the current vehicle speed and the allowable range is taken as the main gear stage 223, so that torque for acceleration is sufficiently obtained and the state after the vehicle is accelerated can be satisfactory.

Meanwhile, as shown in FIGS. 1 and 2, the method of controlling the dual clutch transmission 200 further includes an independent sub-torque-applying step (S350) in which when it is determined that the sub-gear stage 213 and the main gear stage 223 are the same gear stage in the gear stage-comparing/determining step (S300), and when the synchronizing unit 230 and the sub-gear stage 213 have been synchro-meshed, the control unit 400 turns off the neutralizing mode of the vehicle while applying torque to the clutch 215 of the first input shaft 210.

As described above, the main gear stage 223 is determined by comparing the sub-gear stage 213 with the reference gear stage corresponding to an allowable gear stage based on the allowable range of the engine and the current vehicle speed, and when the sub-gear stage 213 is lower than the reference gear stage and is determined to be the main gear stage 223, the sub-gear stage 213 and the main gear stage 223 for driving are consequently the same gear stage.

In this case, there is no need to shift to another gear stage after sub-torque is transmitted through the sub-gear stage 213 when the neutralizing mode is turned off, so shifting is finished while sub-torque is applied by engaging the clutch 215 of the first input shaft with the sub-gear stage 213 synchro-meshed. That is, when the sub-gear stage 213 and the main gear stage 223 are the same and sub-torque is applied, the neutralizing mode is turned off and acceleration is performed.

As shown in FIGS. 1 and 2, the method of controlling the dual clutch transmission 200 further includes: a required time-determining step (S450) that determines whether time taken to synchro-mesh the sub-gear stage 213 is longer than a reference time in the current state, when it is determined that the sub-gear stage 213 and the synchronizing unit 230 have not been synchro-meshed in the pre-engagement completion-determining step (S400); and an independent main torque-applying step (S460) in which when it is determined that the time taken to synchro-mesh the sub-gear stage 213 is longer than a reference time in the required time-determining step (S450), the control unit 400 cancels synchro-mesh of the sub-gear stage 213, gives an instruction to synchro-mesh the main gear stage 223, and applies torque to the clutch 225 of the second input shaft 220.

The present disclosure is technically characterized by inhibiting or preventing acceleration delay by making sub-torque able to be transmitted through the sub-gear stage 213 before main torque is transmitted through the main gear stage 223, which improves acceleration after the neutralizing mode is turned off because the sub-gear stage 213 is engaged in advance.

However, when the control unit 400 receives a signal showing that the accelerator pedal has been pressed down and the neutralizing mode has to be turned off, but the sub-gear stage 213 has not been synchro-meshed, the sub-gear stage 213 is synchro-meshed, sub-torque is applied, and the main torque is applied through the main gear stage 223, but this may be disadvantageous from the aspect of inhibiting acceleration delay.

Accordingly, in the required time determination step (S450), it is determined whether the time that is needed until the sub-gear stage 213 is synchro-meshed when the neutralizing mode has to be turned off is longer than the reference time.

When the time that is needed until the sub-gear stage 213 is synchro-meshed is the same as or shorter than the reference time, the process of synchro-meshing the main gear stage 223 and applying main torque after applying sub-torque through the sub-gear stage 213 is advantageous in reducing the acceleration delay time compared to the processing of immediately transmitting torque through the main gear stage 223 without applying sub-torque.

On the other hand, when the time that is needed until the sub-gear stage 213 is synchro-meshed is the same as or longer than the reference time, it is more advantageous in inhibiting or preventing the acceleration delay to transmit main torque immediately using the main gear stage 223 without using the sub-gear stage 213, considering the time desired to synchro-mesh the sub-gear stage 213, engage the clutch 215 of the first input shaft 215, and then disengage it.

The reference time can be determined theoretically or experimentally in consideration of the time taken to synchro-mesh a gear stage, the time taken to switch torque between the first input shaft 210 and the second input shaft 220 (the time taken to switch engagement of the clutches 215 and 225), and the driving stages at the gear stages after turning off the neutralizing mode and shifting to a gear stage.

As a result, when it is desired to turn off the neutralizing mode but the sub-gear stage 213 has not been synchro-meshed, whether to use the sub-gear stage 213 or use only the main gear stage 223 is determined in consideration of the time taken to synchro-mesh the sub-gear stage 213, thereby determining the improved mechanism for inhibiting or preventing acceleration delay when the neutralizing mode is turned off.

In another form, the method of controlling the dual-clutch transmission 200 further includes a pre-engagement-continuing step (S470) in which, when it is determined that the time taken to synchro-mesh the sub-gear stage 213 is less than the reference time in the required time determination step (S450), the control unit 400 synchro-meshes the sub-gear stage 213 while reducing the rate of increase of the torque from the engine, and when it is determined that the sub-gear stage 213 and the synchronizing unit 230 have been synchro-meshed in the pre-engagement completion-determining step (S400) or in the pre-engagement-continuing step (S470), torque is applied to the clutch 215 of the first input shaft, on which the sub-gear stage 213 is mounted, by the control unit 400 in the sub-torque-applying step (S500).

In detail, when the time taken to synchro-mesh the sub-gear stage 213 is the same as or shorter than the reference time, as described above, the sub-gear stage 213 is synchro-meshed and then the clutch 215 of the first input shaft 210 is engaged, whereby sub-torque is applied.

That is, even considering the time that is needed for synchro-meshing the sub-gear stage 213, it is advantageous from the aspect of inhibiting or preventing acceleration delay to apply sub-torque using the sub-gear stage 213 before main torque is applied through the main gear stage 223, so torque is transmitted through the sub-gear stage 213 in the early stage of turning off the neutralizing mode.

When the sub-gear stage 213 is synchro-meshed and then the clutch 215 of the first input shaft 210 is engaged, a process of engaging the clutch 225 of the second input shaft 220 is performed simultaneously with synchro-meshing the main gear stage 223 and disengaging the clutch 215 of the first input shaft 210.

In another form, as shown in FIGS. 1 and 2, a system for controlling a dual clutch transmission 200 includes: a transmission 200 that is composed of a first input shaft 210, a second input shaft 220, and an output shaft, in which a plurality of gear stages is mounted on the first input shaft 210 and the second input shaft 220 and clutches 215 and 225 are provided for the first input shaft 210 and the second input shaft 220, respectively; a synchronizing unit 230 that is synchro-meshed with any one of the gear stages on the first input shaft 210 or the second input shaft 220 of the transmission 200; a sensor unit 300 that measures the RPM of the first input shaft 210, the RPM of the second input shaft 220, an engine RPM, a vehicle speed, and the pressed amount of an accelerator pedal; and a control unit 400 that determines whether the driving mode of a vehicle is a neutralizing mode, determines a sub-gear stage 213 and a main gear stage 223 when the vehicle is in the neutralizing mode, instructs the synchronizing unit 230 to synchro-mesh with the sub-gear stage 213 in accordance with the driving conditions of the vehicle when the sub-gear stage 213 is determined, determines the driver has the intention to turn off the neutralizing mode in accordance with whether the accelerator pedal has been pressed again after the instruction of synchro-meshing the sub-gear stage 213; determines whether the sub-gear stage 213 and the main gear stage 223 have been determined to be the same gear stage when the driver has the intention to turn off the neutralizing mode, determines whether the sub-gear stage 213 has been synchro-meshed when the sub-gear stage 213 and the main gear stage 223 have been determined to be different gear stages, applies torque to the clutch 215 of the first input shaft 210 on which the sub-gear stage 213 is mounted when the sub-gear stage 213 has been synchro-meshed, instructs the synchronizing unit 230 to synchro-mesh with the main gear stage 223, and removes the torque applied to the clutch 215 of the first input shaft while applying torque to the clutch 225 of the second input shaft 20 mounted with the main gear-stage 223 when it is determined that the synchronizing unit 230 and the main gear stage 223 have been synchro-meshed.

In detail, the transmission 200 includes the first input shaft 210, the second input shaft 220, and the output shaft, in which a plurality of gear stages is mounted on the first input shaft 210 and the second input shaft 220, and the clutches 215 and 225 are provided for the first input shaft 210 and the second input shaft 220, respectively.

The first input shaft 210 and the second input shaft 220 are freely determined in accordance with the positional relationship between the sub-gear stage 213 and the main gear stage 223, so they can be switched. The first and second input shafts are provided with the clutches 215 and 225 and are coupled to coupling shafts.

The synchronizing unit 230 is synchro-meshed with any one of the gear stages on the first input shaft 210 or the second input shaft 220 of the transmission 200. As described above, the synchronizing unit 230 of the present disclosure includes a synchronizer and an actuator, in which a plurality of synchronizers may be provided between the gear stages.

The sensor unit 300 measure the RPM of the first input shaft 210, the RPM of the second input shaft 220, an engine RPM, a vehicle speed, and the pressed amount of an accelerator pedal. Accordingly, the sensor unit includes an RPM sensor 310 for the first input shaft 210, an RPM sensor 320 for the second input shaft 220, an RPM sensor 330 for the engine, a vehicle speed sensor 340, and an acceleration sensor 350 measuring the pressed amount of the accelerator pedal in order to measure the rotational speeds of the components or the pressed amount of the accelerator pedal and transmit a corresponding signal to the control unit 400.

The control unit 400 determines whether the driving mode of a vehicle is a neutralizing mode, determines a sub-gear stage 213 and a main gear stage 223 when the vehicle is in the neutralizing mode, instructs the synchronizing unit 230 to synchro-mesh with the sub-gear stage 213 in accordance with the driving conditions of the vehicle when the sub-gear stage 213 is determined, determines whether a drive has the intention to turn off the neutralizing mode in accordance with whether the accelerator pedal has been tipped in after the instruction of synchro-meshing the sub-gear stage 213; determines whether the sub-gear stage 213 and the main gear stage 223 have been determined to be the same gear stage when the driver has the intention to turn off the neutralizing mode, determines whether the sub-gear stage 213 has been synchro-meshed when the sub-gear stage 213 and the main gear stage 223 have been determined to be different gear stages, applies torque to the clutch 215 of the first input shaft 210 on which the sub-gear stage 213 is mounted when the sub-gear stage 213 has been synchro-meshed, instructs the synchronizing unit 230 to synchro-mesh with the main gear stage 223, and removes the torque applied to the clutch 215 of the first input shaft while applying torque to the clutch 225 of the second input shaft 220 mounted with the main gear-stage 223 when it is determined that the synchronizing unit 230 and the main gear stage 223 have been synchro-meshed.

Although the present disclosure was described with reference to specific forms shown in the drawings, it is apparent to those skilled in the art that the present disclosure may be changed and modified in various ways without departing from the scope of the present disclosure, which is described in the following claims.

What is claimed is:

1. A control method of a dual clutch transmission for a vehicle, the method comprising:
   a pre-engagement-instructing step in which a control unit determines a sub-gear stage and a main gear stage based on driving conditions of the vehicle and starts synchro-meshing a synchronizing unit and the sub-gear stage, when the control unit determines that a driving mode of the vehicle is a neutralizing mode;
   a turn-off intention-determining step in which the control unit determines whether a driver intends to turn off the neutralizing mode based on whether an accelerator pedal in the vehicle is in a tip-in state after the synchronizing unit and the sub-gear stage are started to be synchro-meshed by the control unit in the pre-engagement-instructing step;
   a gear stage-comparing/determining step that determines whether the sub-gear stage and the main gear stage have been determined to be a same gear stage, when the accelerator pedal in the vehicle has been pressed down and the turn-off intention-determining step determines that the driver intends to turn off the neutralizing mode;
   a pre-engagement completion-determining step that determines whether the sub-gear stage and the synchronizing unit have been synchro-meshed, when the sub-gear stage and the main gear stage are different in the gear stage-comparing/determining step;
   a sub-torque-applying step in which the control unit applies torque to a clutch of a first input shaft on which the sub-gear stage is positioned, when the pre-engagement completion-determining step determines that the sub-gear stage and the synchronizing unit have been synchro-meshed; and
   a main torque-applying step in which, when torque is applied to the clutch of the first input shaft in the sub-torque-applying step, the control unit instructs the synchronizing unit to synchro-mesh with the main gear stage, and when the synchronizing unit and the main gear stage are synchro-meshed, the control unit applies torque to a clutch of a second input shaft on which the main gear-stage is positioned and removes the torque applied to the clutch of the first input shaft.

2. The method of claim 1, wherein an expected RPM of the first input shaft and an engine RPM in the neutralizing mode at a current vehicle speed are included in the driving conditions of the vehicle in the pre-engagement-instructing step.

3. The method of claim 2, wherein the sub-gear stage is determined by the control unit such that the expected RPM of the first input shaft is smaller than the engine RPM in the neutralizing mode in the pre-engagement-instructing step.

4. The method of claim 3, wherein the control unit determines a gear stage in which a difference between the expected RPM and the engine RPM is a smallest of a plurality of gear stages in which the expected RPM of the first input shaft is smaller than the engine RPM in the neutralizing mode to be the sub-gear stage in the pre-engagement-instructing step.

5. The method of claim 3, wherein when there is no gear stage in which the expected RPM of the first input shaft is smaller than the engine RPM in the neutralizing mode, the control unit determines a highest gear stage of a plurality of gear stages to be the sub-gear stage in the pre-engagement-instructing step.

6. The method of claim 1, wherein an engine is controlled at an idle RPM or fuel-cut is performed by the control unit in the neutralizing mode of the vehicle.

7. The method of claim 6, wherein when the fuel-cut is performed on the engine in the neutralizing mode, the control unit takes a restart RPM of the engine as an engine RPM in the neutralizing mode.

8. The method of claim 1, wherein the control unit determines a reference gear stage that is a highest gear stage of gear stages within an allowable range of an engine at a current vehicle speed and determines the main gear stage using the reference gear stage and the sub-gear stage in the pre-engagement-instructing step.

9. The method of claim 8, wherein the control unit determines the reference gear stage from a shifting pattern map in which allowable gear stages are determined and stored in advance with the current vehicle speed as a variable in the pre-engagement-instructing step.

10. The method of claim 8, wherein any one of the gear stages on the second input shaft is determined to be the reference gear stage in the pre-engagement-instructing step.

11. The method of claim 8, wherein when the reference gear stage is lower than the sub-gear stage, the control unit determines the reference gear stage as the main gear stage, and when the reference gear stage is higher than the sub-gear stage, the control unit determines the sub-gear stage as the main gear stage in the pre-engagement-instructing step.

12. The method of claim 1, further comprising an independent sub-torque-applying step in which when the gear stage-comparing/determining step determines that the sub-gear stage and the main gear stage are the same gear stage, and when the synchronizing unit and the sub-gear stage have been synchro-meshed, the control unit turns off the neutralizing mode of the vehicle while applying torque to the clutch of the first input shaft.

13. The method of claim 1, further comprising:
a required time-determining step that determines whether a time that is taken to synchro-mesh the sub-gear stage is longer than a reference time in a current state, when the pre-engagement completion-determining step determines that the sub-gear stage and the synchronizing unit have not been synchro-meshed; and
an independent main torque-applying step in which when the required time-determining step determines that a time that is taken to synchro-mesh the sub-gear stage is longer than the reference time, the control unit cancels a synchro-mesh of the sub-gear stage, gives an instruction to synchro-mesh the main gear stage, and applies torque to the clutch of the second input shaft.

14. The method of claim 13, further comprising:
a pre-engagement-continuing step in which when the required time-determining step determines that the time that is taken to synchro-mesh the sub-gear stage is less than the reference time, the control unit synchro-meshes the sub-gear stage while reducing a rate of increase of torque from an engine,
wherein when the pre-engagement completion-determining step or the pre-engagement-continuing step determines that the sub-gear stage and the synchronizing unit have been synchro-meshed, torque is applied to the clutch of the first input shaft on which the sub-gear stage is mounted, by the control unit in the sub-torque-applying step.

15. A system for controlling a dual clutch transmission for a vehicle, the system comprising:
a transmission comprising a first input shaft, a second input shaft, and an output shaft, in which a plurality of gear stages are mounted on the first input shaft and the second input shaft and clutches are provided for the first input shaft and the second input shaft, respectively;
a synchronizing unit configured to synchro-mesh with any one of the gear stages on the first input shaft or the second input shaft of the transmission;
a sensor unit configured to measure an RPM of the first input shaft, an RPM of the second input shaft, an engine RPM, a vehicle speed, and a pressed amount of an accelerator pedal; and
a control unit configured to determine whether a driving mode of a vehicle is a neutralizing mode, determine a sub-gear stage and a main gear stage when the vehicle is in the neutralizing mode, instruct the synchronizing unit to synchro-mesh with the sub-gear stage based on driving conditions of the vehicle when the sub-gear stage is determined, the control unit configured to determine whether a driver intends to turn off the neutralizing mode based on whether the accelerator pedal has been tipped in after the instruction of synchro-meshing the sub-gear stage, configured to determine whether the sub-gear stage and the main gear stage have been determined to be a same gear stage when the driver intends to turn off the neutralizing mode, configured to determine whether the sub-gear stage has been synchro-meshed when the sub-gear stage and the main gear stage have been determined to be different gear stages, configured to apply torque to a clutch of the first input shaft on which the sub-gear stage is mounted when the sub-gear stage has been synchro-meshed, configured to instruct the synchronizing unit to synchro-mesh with the main gear stage, and configured to remove the torque applied to the clutch of the first input shaft while applying torque to a clutch of the second input shaft mounted with the main gear-stage when the synchronizing unit and the main gear stage have been synchro-meshed.

* * * * *